(12) United States Patent
Shibuya

(10) Patent No.: US 7,299,066 B2
(45) Date of Patent: Nov. 20, 2007

(54) TELEPHONE SET ATTACHING MEMBER AND PORTABLE TELEPHONE SET

(75) Inventor: Toshiyuki Shibuya, Tokyo (JP)

(73) Assignee: NEC Corporation, Tokyo (JP)

( * ) Notice: Subject to any disclaimer, the term of this patent is extended or adjusted under 35 U.S.C. 154(b) by 584 days.

(21) Appl. No.: 10/738,051

(22) Filed: Dec. 18, 2003

(65) Prior Publication Data

US 2004/0132507 A1 Jul. 8, 2004

(30) Foreign Application Priority Data

Dec. 24, 2002 (JP) ............................. 2002-371859

(51) Int. Cl.
*H04M 1/00* (2006.01)

(52) U.S. Cl. .................. 455/556.1; 455/90.3; 455/557; 379/433.11

(58) Field of Classification Search ............ 455/575.1, 455/575.3, 90.3, 557, 556.1, 556, 556.2; 379/433.11, 433.13

See application file for complete search history.

(56) References Cited

U.S. PATENT DOCUMENTS

| 5,263,875 | A | 11/1993 | Spicer et al. |
|---|---|---|---|
| 5,692,046 | A | 11/1997 | Jambhekar |
| 5,816,725 | A | 10/1998 | Sherman et al. |
| 5,964,847 | A | 10/1999 | Booth, III et al. |
| 6,356,442 | B1 | 3/2002 | Lunsford |
| 2002/0086703 | A1 | 7/2002 | Dimenstein et al. |
| 2002/0101705 | A1 | 8/2002 | Genest et al. |
| 2002/0137542 | A1 | 9/2002 | Masutani et al. |

FOREIGN PATENT DOCUMENTS

| GB | 2 277 422 A | 10/1994 |
|---|---|---|
| JP | 2000-209317 A | 7/2000 |
| JP | 2000-252144 A | 9/2000 |
| JP | 2000-253118 A | 9/2000 |
| JP | 2002-50978 A | 2/2002 |
| JP | 2002-198849 A | 7/2002 |
| JP | 2002-208999 A | 7/2002 |
| WO | WO 01/37229 A1 | 5/2001 |

*Primary Examiner*—Lee Nguyen
(74) *Attorney, Agent, or Firm*—Sughrue Mion Pllc.

(57) ABSTRACT

A portable telephone set comprises a substrate part and a telephone set and an accessory device, which are attached to the substrate part. The substrate part includes a first connector connected with the telephone set, a second connector connected with the accessory device and a wiring part for connecting between these connectors. The accessory device is one or more of, for example, a display device with a speaker, a camera and a data communication device. Between a telephone set installation region and an accessory device installation region of the substrate part, a hinge part or a flexible member is disposed. Therefore, the portable telephone set can be folded.

28 Claims, 8 Drawing Sheets

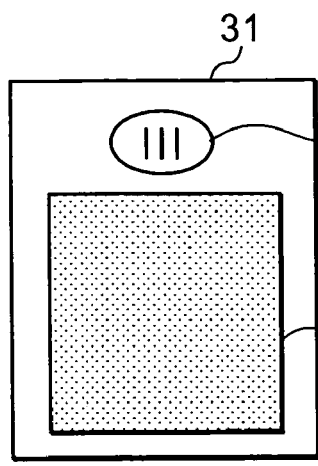
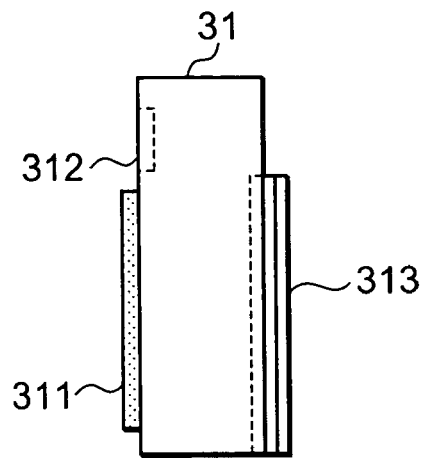
FIG. 4A        FIG. 4B
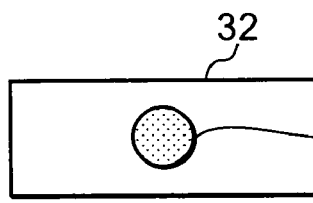
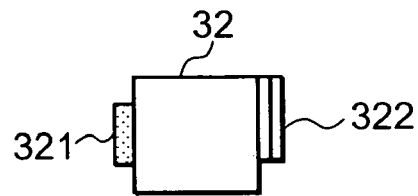
FIG. 5A        FIG. 5B
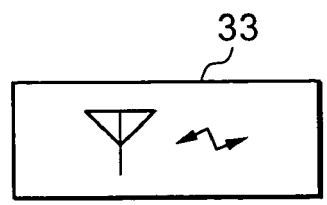
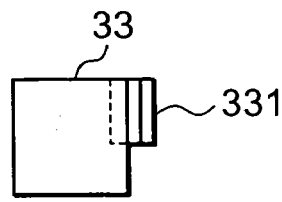
FIG. 6A        FIG. 6B
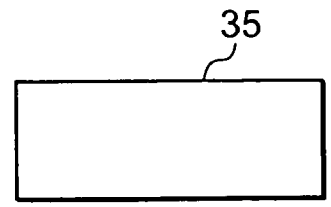
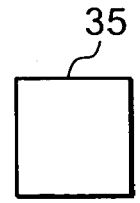
FIG. 7A        FIG. 7B

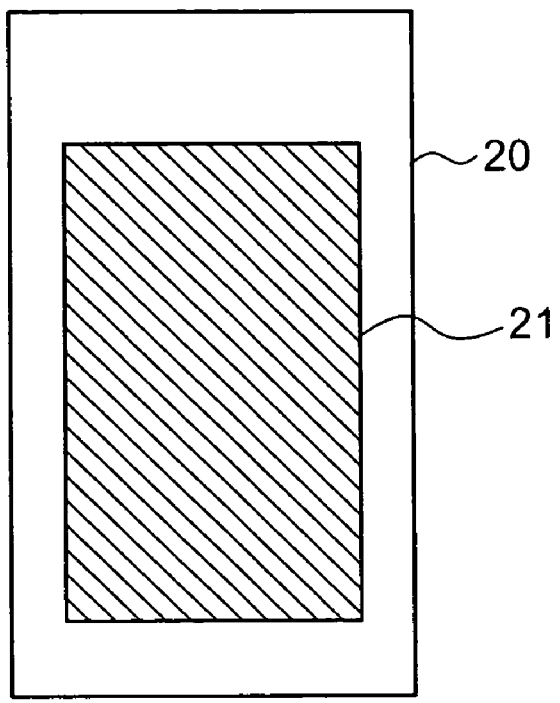
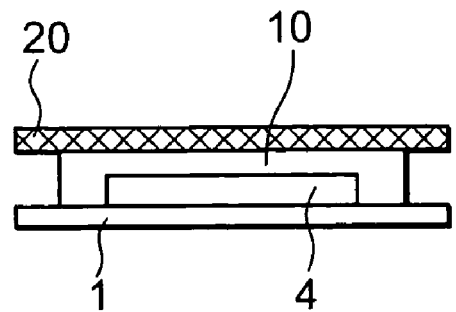
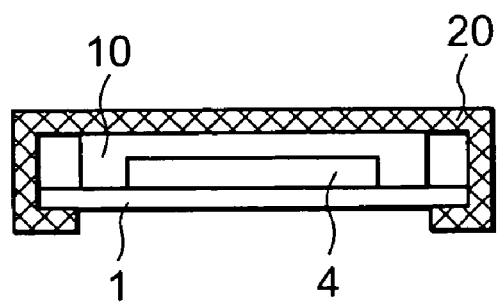
FIG. 13A
FIG. 13B
FIG. 13C

TELEPHONE SET ATTACHING MEMBER AND PORTABLE TELEPHONE SET

BACKGROUND OF THE INVENTION

1. Field of the Invention

The present invention relates to a portable telephone set attaching member and a portable telephone set, more particularly to assembly of a telephone set and an accessory component.

2. Description of the Related Prior Art

In recent years, a portable telephone set having many functions built-in has been widely used. For example, a portable telephone set with a camera can easily send an image photographed by the camera to a person on the other end of the line. However, since the camera is installed inside of the portable telephone set, the camera cannot be used independently or for other purposes by being detached from the portable telephone set (Japanese Patent Laid-Open No. 2002-198849).

Meanwhile, there is disclosed a portable telephone set with a detachable camera. Examples of the portable telephone set with the detachable camera are described in Japanese Patent Laid-Open Nos. 2000-252144, 2000-253118, 2002-050978 and the like. Furthermore, a portable telephone set having a detachable liquid crystal display unit is disclosed in Japanese Patent Laid-Open No. 2002-208999, and a portable telephone set having a detachable card for data communication is disclosed in Japanese Patent Laid-Open No. 2000-209317.

However, normally, it is difficult or impossible to carry a portable telephone set having an accessory device attached thereto. Moreover, when an accessory device such as a camera is attached integrally with a portable telephone set, the camera has a shape which makes it difficult for the camera to be used independently based on restrictions on designing of the portable telephone set.

SUMMARY OF THE INVENTION

A portable telephone set attaching member according to one example of the present invention includes: a substrate part having a telephone set installation region and an accessory device installation region; a first connector that is connected with a telephone set; a second connector that is connected with an accessory device; and a wiring part that connects the first and second connectors with each other. A portable telephone set according to one example of the present invention includes: a substrate part; and a telephone set and an accessory device that are attached to the substrate parts. The substrate part includes: a first connector that is connected with the telephone set; a second connector that is connected with the accessory device; and a wiring part that connects the first and second connectors with each other.

The telephone set installation region and the accessory device installation region, which are included in the above-described substrate parts, can be connected with each other by use of hinge parts or flexible members. A plate member including an opening can be disposed on an upper surface of at least one of the telephone set and the accessory device. The substrate and the plate member are connected with each other by use of fastenings. The telephone set can be set to be usable by entering predetermined ID information.

By use of the portable telephone set described above, various functions can be used according to need. Moreover, the accessory device can be attached integrally to the portable telephone set and the portable telephone set can be easily carried around.

BRIEF DESCRIPTION OF THE DRAWINGS

The above and other objects, features and advantages of the present invention will become apparent from the following detailed description when taken with the accompanying drawings in which:

FIGS. 4A and 4B are plan view and side view of a display unit according to an embodiment, respectively;

FIGS. 5A and 5B are plan view and side view of a camera unit according to an embodiment, respectively;

FIGS. 6A and 6B are plan view and side view of a data communication unit according to an embodiment, respectively;

FIGS. 7A and 7B are plan view and side view of a blank panel according to an embodiment, respectively;

FIGS. 13A to 13C are plan views of a plate member disposed on an upper surface of the telephone set or other accessory devices according to an embodiment.

DETAILED DESCRIPTION OF THE PREFERRED EMBODIMENTS

Figure 1:
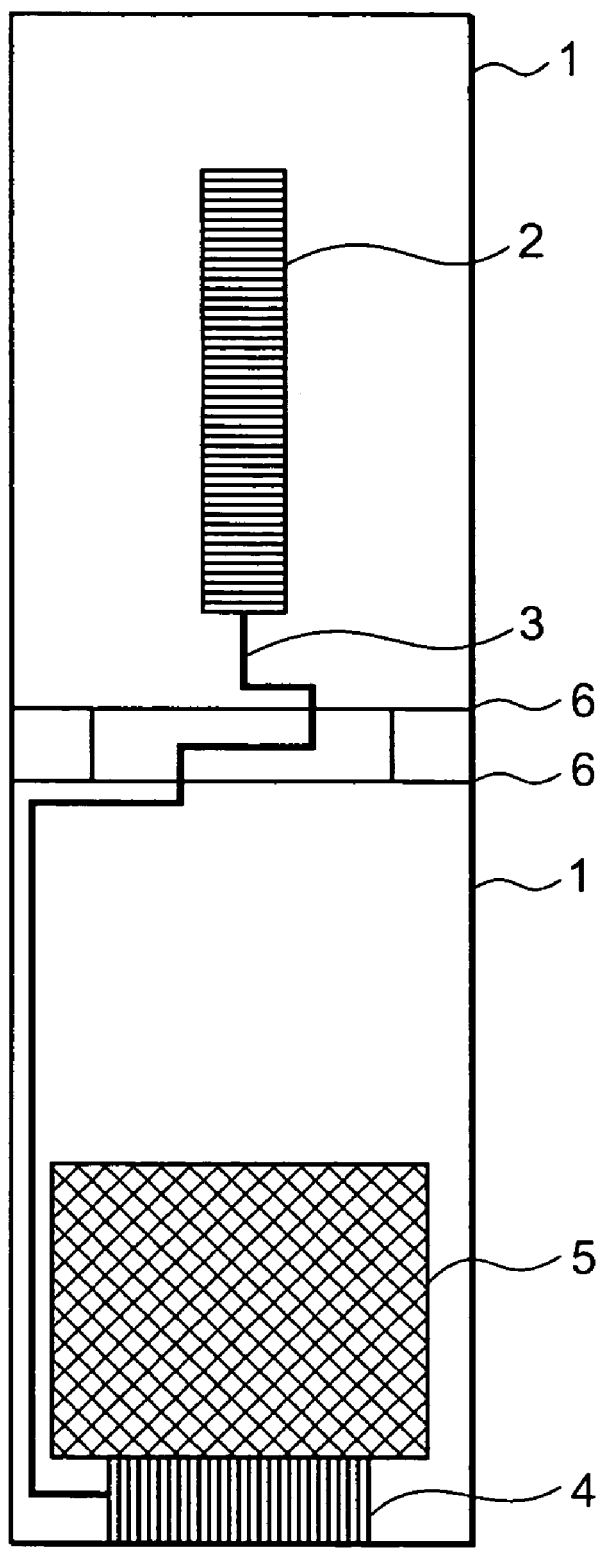
FIG. 1 is a plan view of a telephone set attaching member according to an embodiment.

With reference to FIG. 1, a telephone set attaching member according to an embodiment of the present invention includes two substrate parts 1 and two hinge parts 6 for connecting the substrate parts 1 with each other. One of the substrate parts 1 includes a connector 2 that is connected with an accessory component, and the other thereof includes a connector 4 that is connected with a telephone set. The above-described substrate parts 1 include a wiring part 3 for connecting the connectors 2 and 4 with each other. The substrate part 1 in which the telephone set is disposed has an opening 5. This opening 5 is used to replace a battery of the telephone set. If the telephone set is detached from the above-described telephone set attaching member for replacing the battery thereof, this opening is unnecessary. The telephone set attaching member shown in FIG. 1 can be folded at portions of the hinge parts 6. For the hinge parts 6, one or two hinges are used. When the two substrate parts 1 are folded, a certain space needs to be formed between the substrate parts. The connector 4 can be connected with a maintenance terminal of the telephone set 10. The maintenance terminal can be connected with an external device via the connector 4.

Figure 2:
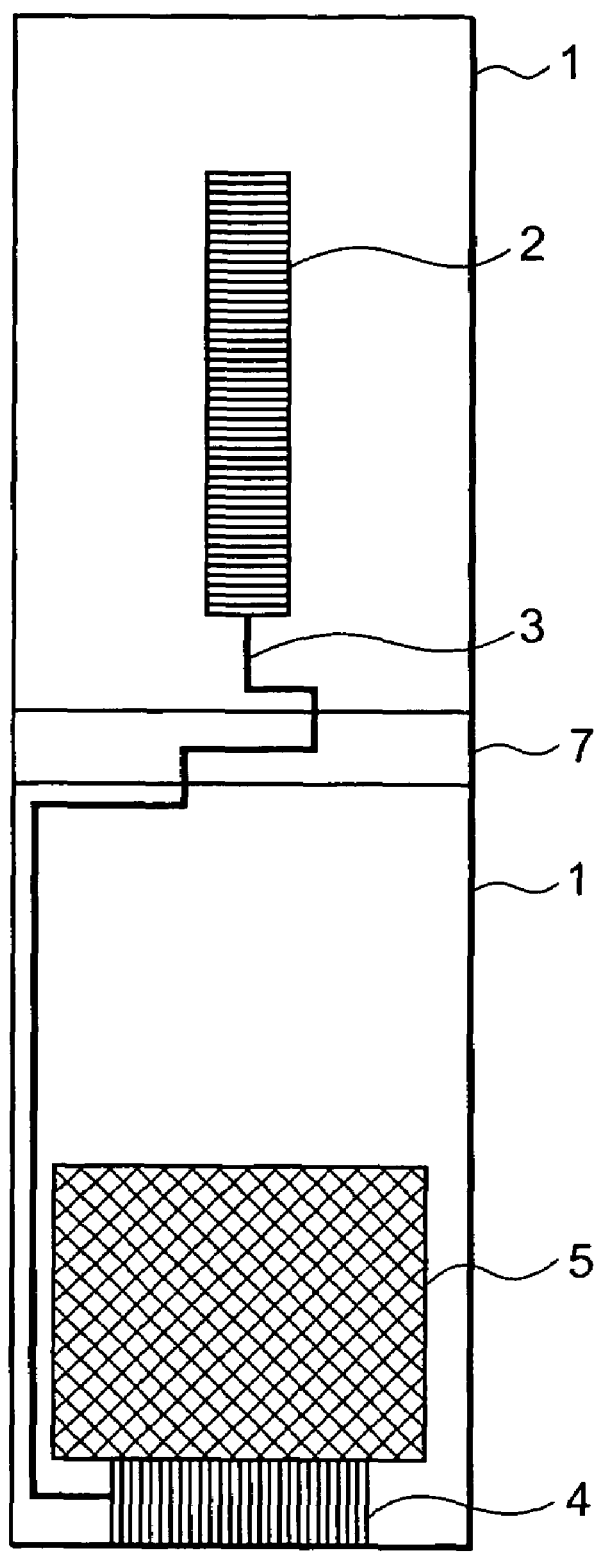
FIG. 2 is a plan view of a telephone set attaching member according to another embodiment.

FIG. 2 shows a telephone set attaching member according to another embodiment. In the member of this embodiment, in place of the hinge parts 6 shown in FIG. 1, a flexible member 7 connects the two substrate parts with each other. Therefore, the two substrate parts 1 can be folded at a portion of this flexible member 7. The above-described flexible member 7 is formed of resin or a cornice-shaped member.

Figure 3A:
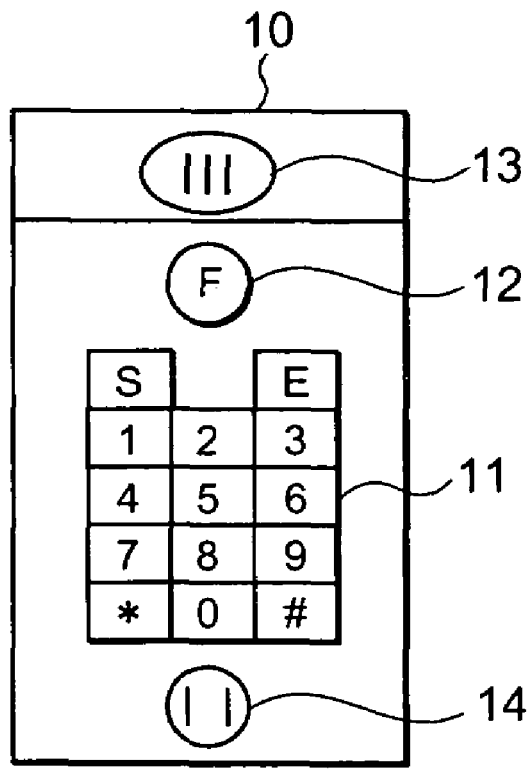
FIGS. 3A to 3C are plan view, front view and side view of a telephone set according to an embodiment, respectively.
Figure 3B:
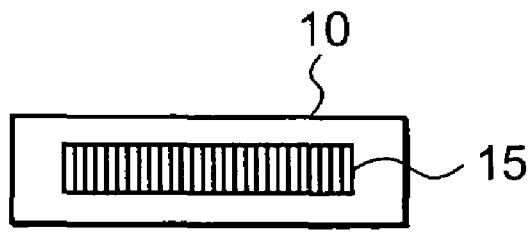
Figure 3C:
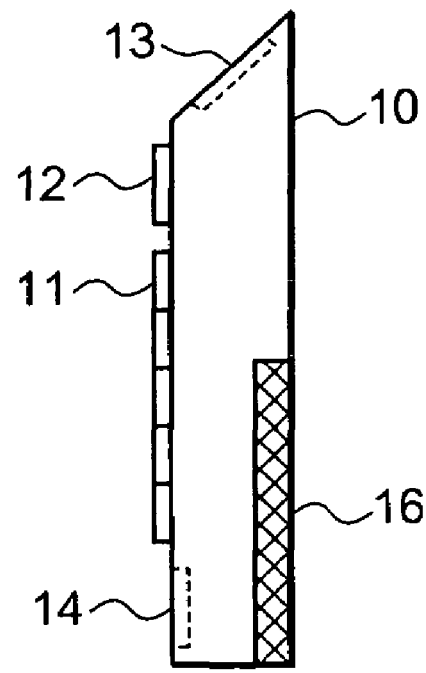

FIGS. 3A to 3C show a telephone set attached to the above-described telephone set attaching member according to an embodiment. This telephone set 10 includes an input key part 11, a function key 12, a speaker 13, a microphone 14, a connector 15 and a battery case 16. The speaker 13 and the microphone 14 are disposed in the vicinity of separate end portions of the telephone set 10, respectively. A battery is installed in the battery case 16 from a side opposite to that of the input key part 11. Aside part of the telephone set 10 includes a connector 15 that is connected with the connector 4. The telephone set 10 of this embodiment does not include a liquid crystal display part. However, a telephone set including a small liquid crystal display part can be also used.

FIGS. 4A and 4B show a display unit 31 attached to the telephone set attaching member according to an embodiment. This display unit 31 includes a large-size liquid crystal display part 311, a speaker 312 and a connector 313. The speaker 312 is used when the display unit 31 is attached to the telephone set attaching member. FIGS. 5A and 5B show a camera unit 32 according to an embodiment. The camera unit 32 includes a lens 321 and a connector 322. FIGS. 6A and 6B show a data communication unit 33. The data communication unit 33 includes a connector 331 and a communication device for transmitting/receiving data to/from a home computer and various information processors, which are located at a relative short distance. FIGS. 7A and 7B show a dummy unit 35. The dummy unit 35 is provided in the substrate 1 as the above-described spacer when the display unit 31, the camera unit 32 or the data communication unit 33 is not mounted on the telephone set attaching member.

Figure 10:
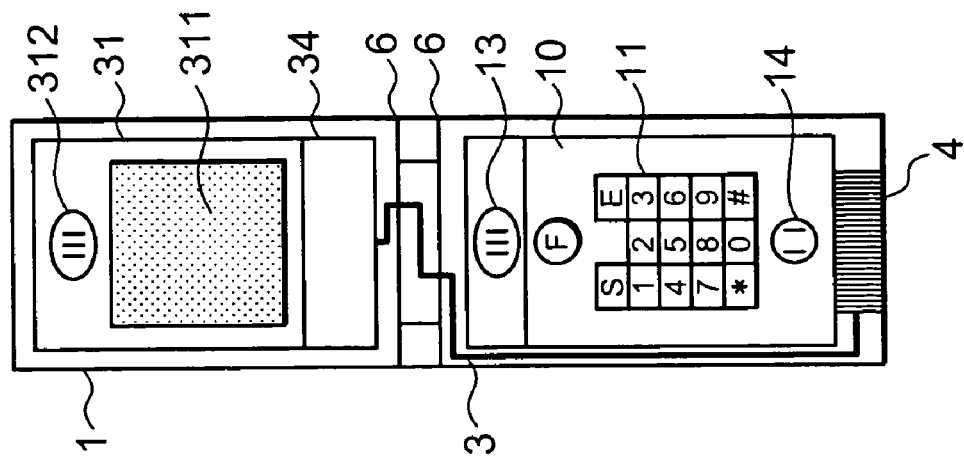
FIG. 10 is a plan view of a portable telephone set in which the telephone set, the display unit and the blank panel are installed in the telephone set attaching member.
Figure 9:
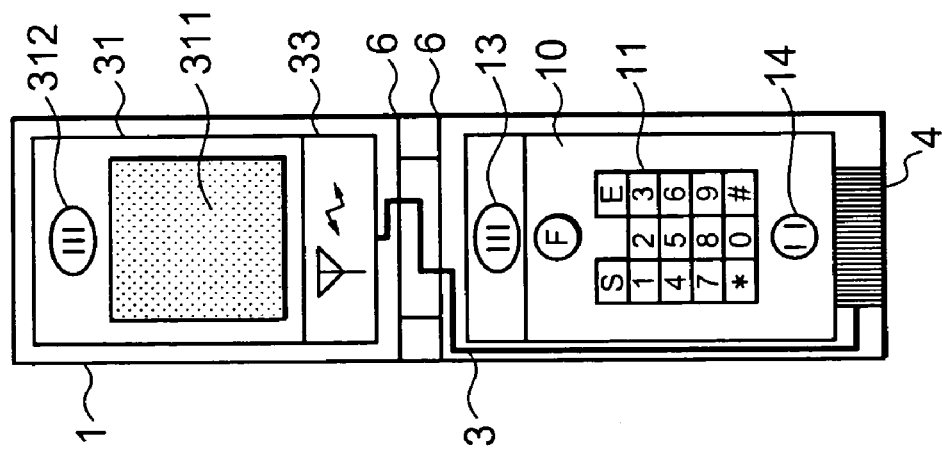
FIG. 9 is a plan view of a portable telephone set in which the telephone set, the display unit and the data communication unit are installed in the telephone set attaching member.
Figure 8:
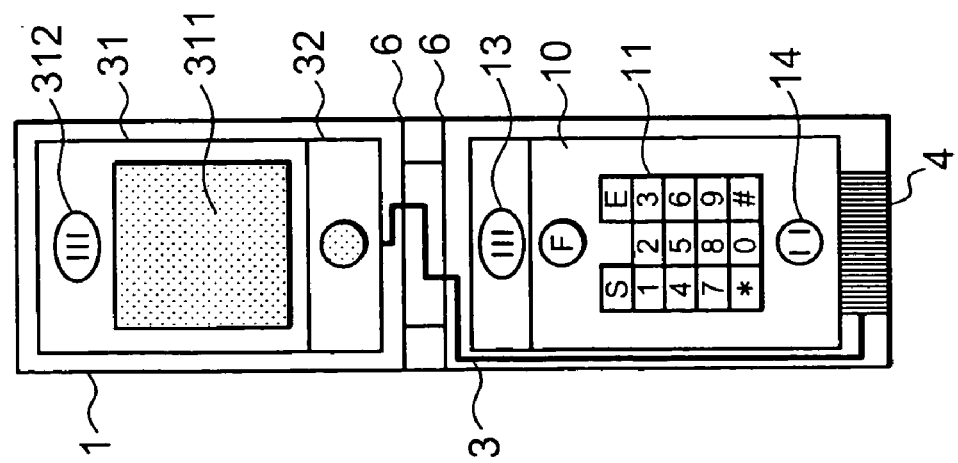
FIG. 8 is a plan view of a portable telephone set in which the telephone set, the display unit and the camera unit are installed in the telephone set attaching member.

FIGS. 8 to 10 show portable telephone sets according to embodiments, in which the camera unit 32, the data communication unit 33 and the dummy unit 35 are attached to the telephone set attaching member, respectively, other than the telephone set 10 and the display unit 31. The telephone set 10 is connected with the connector 4 and each of the units is connected with the connector 2. The telephone set 10 and each of the units can be tightly connected with the connectors 4 and 2, respectively. However, actually, the telephone set 10 and each of the units can be more tightly connected with the substrate parts 1 by use of fastenings (not shown). For example, the fastening is a U-shaped elastic body made of resin and is attached so as to sandwich the telephone set 10 (or each of the units described above) and the substrate part 1. The fastenings are attached at positions that do not hinder operations of the telephone set. The fastening may be such a thing as a resin belt, other than the example described above.

Figure 11:
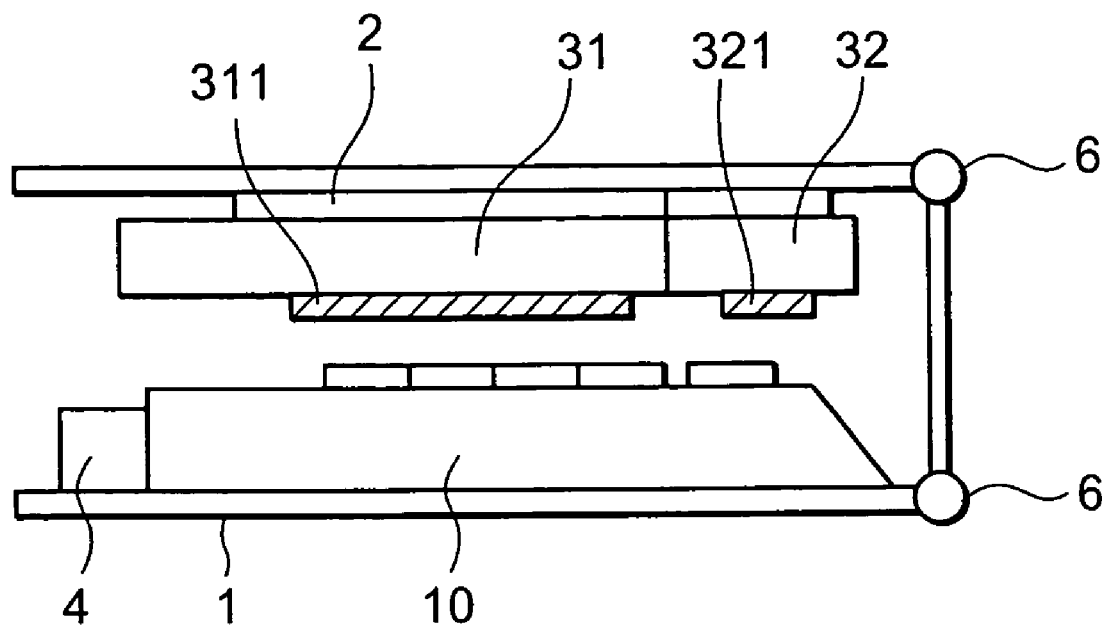
FIG. 11 is a plan view of a portable telephone set when folded, in which the telephone set, the display unit and the camera unit are installed in the telephone set attaching member.

FIG. 11 shows a portable telephone set according to an embodiment of the present invention. In FIG. 11, the portable telephone set is folded at the portions of the two hinge parts 6. To the substrate parts 1, the telephone set 10, the display unit 31 and the camera unit 32 are attached. In this case, if the U-shaped resin fastenings (not shown) for connecting the telephone set 10 and the substrate part 1 are provided, these fastenings function as spacers between the liquid crystal display part 311 and the input key part 11 and between the lens 321 and the input key part 11. Thus, damage of the liquid crystal display part 311 and the lens 321 is prevented.

Figure 12:
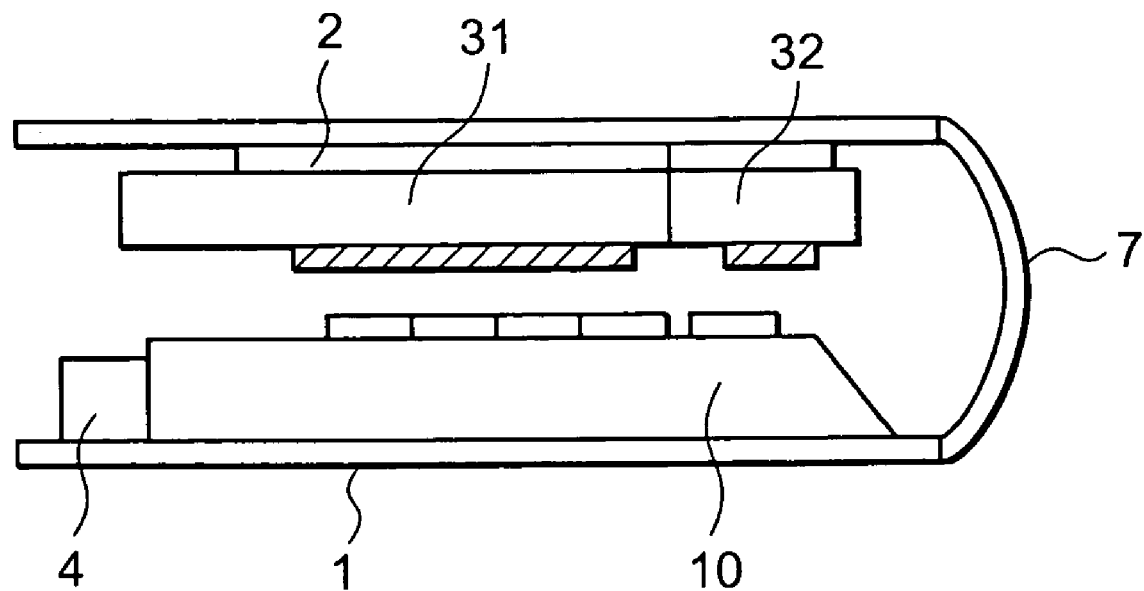
FIG. 12. is a plan view of a portable telephone set when folded, in which the telephone set, the display unit and the camera unit are installed in another telephone set attaching member.

FIG. 12 shows a portable telephone set according to another embodiment of the present invention. In FIG. 12, the portable telephone set is folded at the portion of the flexible member 7. This flexible member can be formed of resin or a cornice-shaped structure body.

FIG. 13A shows a plan view of a plate member 20 disposed on an upper surface of the telephone set 10 or the respective units. In this plate member 20, an opening 21 is formed so, that the input key part 11 and the liquid crystal display part 311 can be used.

FIG. 13B shows a side of a portable telephone set in which the plate member 20 is disposed. In this case, the above-described U-shaped resin fastenings can be used to connect the plate member 20 and the substrate part 1 with each other. Alternatively, the plate member 20 and the substrate part 1 can be connected with each other by use of screws.

With reference to FIG. 13C, the plate member 20 is not a flat plate but has a shape that can be fitted into the portable telephone set. For example, when the input key part 11 of the telephone set 10 is not projected from the upper surface of the telephone set, the plate member 20 as described above can be used. In this case, no fastenings or screws are required.

Figure 14:
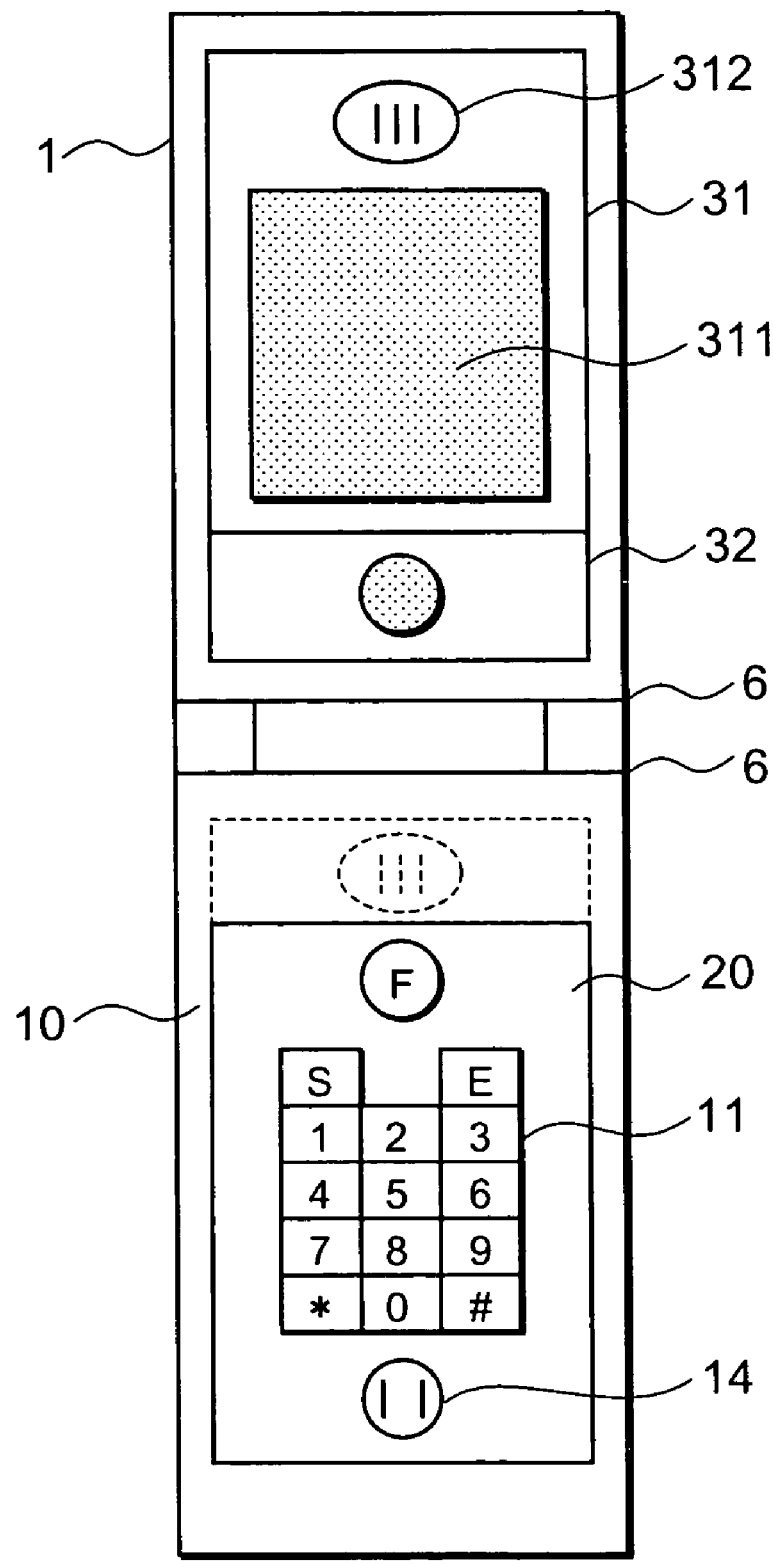
FIG. 14 is a plan view of a portable telephone set, in which the plate member exemplified in FIGS. 13A to 13C is installed, according to an embodiment.

FIG. 14 shows a plan view of a portable telephone set in which the above-described plate member 20 is disposed on the upper surface of the telephone set 10. The plate member 20 covers the speaker 13 included in the telephone set 10 and the vicinity thereof. Moreover, since the opening 21 is formed, the input key part 11 and the microphone 14 can be used. The plate member 20 can be disposed also on the upper surface of the respective units.

When the telephone set is attached to the telephone set attaching member described above, the portable telephone set is operated as below, for example. First, when a user sets the telephone set 10 and the respective units and turns on a power of the telephone set, a control part in the telephone set 10 detects which one of the display unit 31, the camera unit 32 and the data communication unit 33 is mounted and requests the user to enter a predetermined ID number. Once the user enters a correct ID number, the portable telephone set becomes usable. According to another embodiment, it is requested to enter ID information corresponding to the respective units described above. When a correct ID number is not entered, when the above-described units are not set and when the above-described units are connected to wrong connectors, the telephone set emits an alarm sound.

In another example of the portable telephone set described above, the display unit 31, the camera unit 32 and the data communication unit 33 can be all connected with the connector 2. When the display unit 31 is mounted, the above-described control part can stop functions of the speaker 13 of the telephone set 10.

While the present invention has been described in connection with certain preferred embodiments, it is to be understood that the subject matter encompassed by the present invention is not limited to those specific embodiments. On the contrary, it is intended to include all alternatives, modifications, and equivalents as can be included within the spirit and scope of the following claims.

What is claimed is:

1. A member for attaching a telephone set, comprising
a substrate part comprising a telephone set installation region and an accessory device installation region;
a first connector associated with the telephone set installation region for connection to a telephone set;
a second connector associated with the accessory device installation region and configured to be releasably connected to an accessory device; and
a wiring part that connects the first and second connectors with each other.

2. The member according to claim 1, wherein the second connector can be connected with many kinds of accessory devices.

3. The member according to claim 1, wherein a hinge part is formed between the telephone set installation region and the accessory device installation region.

4. The member according to claim 3, wherein the hinge parts are disposed at two places.

5. The member according to claim 1, wherein a flexible member is disposed between the telephone set installation region and the accessory device installation region of the substrate part.

6. The member according to claim 1, wherein the telephone set installation region of the substrate part has an opening.

7. The member according to claim 1, wherein at least one of the telephone set and the accessory device is connected with the substrate by use of fastenings.

8. A member for attaching a telephone set, comprising:
a substrate part comprising a telephone set installation region and an accessory device installation region;
a first connector for connection to a telephone set;
a second connector for connection to an accessory device;
a wiring part that connects the first and second connectors with each other; and
a plate member comprising an opening, the plate member being disposed on an upper surface of at least one of the telephone set and the accessory device, wherein the substrate and the plate member are connected with each other by use of fastenings.

9. A portable telephone set comprising:
a substrate part; and
a telephone set and an accessory device, which are attached to the substrate part,
wherein the substrate part comprises a first connector for connection to the telephone set, a second connector configured to be releasably connected to the accessory device and a wiring part that connects the first and second connectors with each other.

10. The portable telephone set according to claim 9, wherein the telephone set includes a key part, a microphone, a speaker and a connector.

11. The portable telephone set according to claim 9, wherein the accessory device is any of one and more of a display device with a speaker, a camera and a data communication device.

12. The portable telephone set according to claim 9, wherein the substrate part comprises a telephone set installation region and an accessory device installation region and a hinge part is formed between these regions.

13. The portable telephone set according to claim 12, wherein the hinge parts are disposed at two places.

14. The portable telephone set according to claim 9, wherein the substrate part comprises a telephone set installation region and an accessory device installation region and a flexible member is disposed between these regions.

15. The portable telephone set according to claim 9, wherein the substrate part comprises a telephone set installation region and the region has an opening.

16. The portable telephone set according to claim 9, wherein at least one of the telephone set and the accessory device is attached to the substrate by use of fastenings.

17. The portable telephone set according to claim 9, wherein the portable telephone set becomes usable by entering predetermined ID information.

18. The portable telephone set according to claim 17, wherein it is requested to enter ID information inherent to each accessory device.

19. The portable telephone set according to claim 9, wherein, in place of one accessory device, a dummy unit can be connected with the second connector.

20. The portable telephone set according to claim 9, wherein the first connector is connected with a maintenance terminal of the telephone set and can be connected with an external device.

21. A portable telephone set comprising:
a substrate part;
a telephone set and an accessory device, which are attached to the substrate part,
wherein the substrate part comprises a first connector for connection to the telephone set, a second connector for connection to the accessory device and a wiring part that connects the first and second connectors with each other; and
a plate member comprising an opening, the plate member being disposed on an upper surface of at least one of the telephone set and the accessory device, wherein the substrate and the plate member are connected with each other by use of fastenings.

22. The portable telephone set according to claim 21, further comprising:
a first plate member that is disposed on an upper surface of the telephone set and has an opening; and
a second plate member that is disposed on an upper surface of the accessory device and has an opening.

23. The portable telephone set according to claim 21, wherein the telephone set comprises a speaker and the plate member disposed on the upper surface of the telephone set covers the speaker.

24. The portable telephone set according to claim 21, wherein the fastenings are screws.

25. The portable telephone set according to claim 21, wherein the fastenings are U-shaped elastic members.

26. A portable telephone set comprising:
a substrate part;
a telephone set and an accessory device, which are attached to the substrate part,
wherein the substrate part comprises a first connector for connection to the telephone set, a second connector for connection to the accessory device and a wiring part that connects the first and second connectors with each other;
a first plate member that is disposed on an upper surface of the telephone set and has an opening; and
a second plate member that is disposed on an upper surface of the accessory device and has an opening.
wherein the substrate and each of the plate members are connected with each other by use of fastenings and the first and second plate members are connected with each other by use of a hinge part.

27. The portable telephone set according to claim 26, wherein the substrate part comprises a telephone set installation region and an accessory device installation region and a flexible member is disposed between these regions.

28. A portable telephone set comprising:
a substrate part; and
a telephone set and an accessory device, which are attached to the substrate part,
wherein the substrate part comprises a first connector for connection to the telephone set, a second connector for connection to the accessory device and a wiring part that connects the first and second connectors with each other,
wherein at least one of the telephone set and the accessory device is attached to the substrate by use of U-shaped elastic members.

* * * * *